United States Patent
Kwag et al.

(10) Patent No.: US 7,050,133 B2
(45) Date of Patent: May 23, 2006

(54) PANEL FOR LIQUID CRYSTAL DISPLAY

(75) Inventors: Jin-Oh Kwag, Suwon (KR); Jang-Soo Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 261 days.

(21) Appl. No.: 09/940,457

(22) Filed: Aug. 29, 2001

(65) Prior Publication Data

US 2002/0047961 A1    Apr. 25, 2002

(30) Foreign Application Priority Data

Aug. 29, 2000    (KR) .................... 10-2000-0050546

(51) Int. Cl.
*G02F 1/1333*    (2006.01)
(52) U.S. Cl. ................ 349/122; 349/123; 349/160
(58) Field of Classification Search ............. 349/122, 349/123, 125, 130, 160, 129
See application file for complete search history.

(56) References Cited

U.S. PATENT DOCUMENTS

| | | | | |
|---|---|---|---|---|
| 5,309,264 A | * | 5/1994 | Lien et al. | 349/143 |
| 6,057,896 A | * | 5/2000 | Rho et al. | 349/42 |
| 6,229,589 B1 | * | 5/2001 | Koma | 349/139 |
| 6,233,034 B1 | * | 5/2001 | Lee et al. | 349/141 |
| 6,449,025 B1 | * | 9/2002 | Lee | 349/129 |
| 6,469,764 B1 | * | 10/2002 | Kim et al. | 349/141 |
| 6,512,565 B1 | * | 1/2003 | Lee et al. | 349/130 |
| 6,542,211 B1 | * | 4/2003 | Okada et al. | 349/130 |
| 6,549,252 B1 | * | 4/2003 | Lee et al. | 349/47 |

* cited by examiner

*Primary Examiner*—Tom Thomas
*Assistant Examiner*—N. Drew Richards

(57) ABSTRACT

A pixel electrode is formed in the pixel area defined by longitudinal data lines and transverse gate lines, and has openings. Projections made up of a gate insulating film and a passivation film are formed under the pixel electrode, and a gate pattern is formed under the projections. This gate pattern is formed to be wider than the projections to fully cover texture around the projections.

8 Claims, 2 Drawing Sheets

PANEL FOR LIQUID CRYSTAL DISPLAY

BACKGROUND OF THE INVENTION

1. Field of the Invention

The present invention relates to a liquid crystal display and a panel for a liquid crystal display, more particularly, to a vertically aligned liquid crystal display which has opening patterns and projections formed at pixel electrodes, and a thin film transistor (TFT) array panel therefor.

2. Description of the Related Art

Generally, a liquid crystal display includes an upper panel having a common electrode and color filters, a lower panel having TFTs and pixel electrodes, and a liquid crystal layer between the two panels. The pixel electrodes and the common electrode are applied with different electric potentials to form electric fields, which change the alignment of liquid crystal molecules to control the light transmittance, thereby displaying images.

However, a liquid crystal display has a serious disadvantage that its viewing angle is narrow. To overcome this disadvantage, various techniques for widening the viewing angle are suggested. Among them, there is a technique that the liquid crystal molecules are aligned vertical to the upper and the lower panels and opening patterns or projections are provided in pixel electrodes and a common electrode facing the pixel electrodes.

In a conventional technique of providing the opening patterns, the opening patterns are formed in both the pixel electrodes and the common electrode to generate fringe field. The tilt directions of liquid crystal molecules are adjusted by using the fringe field.

However, the above conventional technique requires an additional photolithography process for pattering the common electrode of indium-tin-oxide (ITO) on the color filters to form the opening patterns.

Furthermore, the adhesive strength between the color filters of resin and the common electrode of ITO deposited on the color filters by sputtering is bad and hence the etching precision of the common electrode is poor. In addition, in order to prevent the damage in the color filters exposed when etching the ITO, the color filters are generally coated with a reliable overcoat film of organic insulating material which is very expensive. When the overcoat film is adapted between the color filters and the common electrode, the common electrode cannot be in direct contact with the black matrix of chrome (Cr) which is generally disposed under the overcoat film, thereby increasing the resistance to raise flicker. Also the opening pattern of the common electrode causes the resistance of the common electrode to be increased.

On the other hand, there is a difficulty in precisely aligning the opening pattern formed in the common electrode of the upper panel with that formed in the pixel electrodes of the lower panel when assembling the upper and the lower panels.

A conventional technique of providing projections is that the tilt directions of the liquid crystal molecules are adjusted by using electric field distorted by the projection formed in both the common electrode of the upper panel and the pixel electrode of the lower panel.

However, the above method has problems that the product cost increases due to additional processes of forming the projections in the upper and the lower panels and that the projections in the respective panels have to be precisely aligned.

There is another conventional technique that opening patterns and the projections are provided in the pixel electrodes on the lower panel and the common electrode on the upper panel, respectively, to generate fringe field. The tilt directions of the liquid crystal molecules are adjusted by using the fringe field, thereby forming domains.

However, the above technique has difficulties in precisely aligning the projection and the opening pattern when assembling the upper and the lower panels as well as adding the process of forming the projections on the common electrode.

Furthermore, when the projections or the openings are adapted to control the tilt directions of the liquid crystal molecules, texture is created due to the disordered alignment of the liquid crystal molecules around the projections or the openings. This texture brings about light leakage and produces a bad effect on picture quality.

SUMMARY OF THE INVENTION

It is an object of the present invention to provide a liquid crystal display having opening patterns and projections for widening the viewing angle without complexing the manufacturing process of the liquid crystal display.

It is another object of the present invention to cover texture which deteriorates the picture quality.

To solve aforementioned problems, in the present invention, domain defining member is provided only in one panel and are covered by shading film patterns.

A panel according to the present invention includes an insulating substrate. A first wire and a second wire are formed on the insulating substrate, and the second wire is insulated from and intersects the first wire. A pixel electrode is formed in a pixel area defined by the intersection of the first wire and the second wire. A domain-defining member is provided over the insulating substrate. A shading film is formed on the insulating substrate. The shading film has a different plane view from the domain-defining member and overlaps the domain-defining member at least in part.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
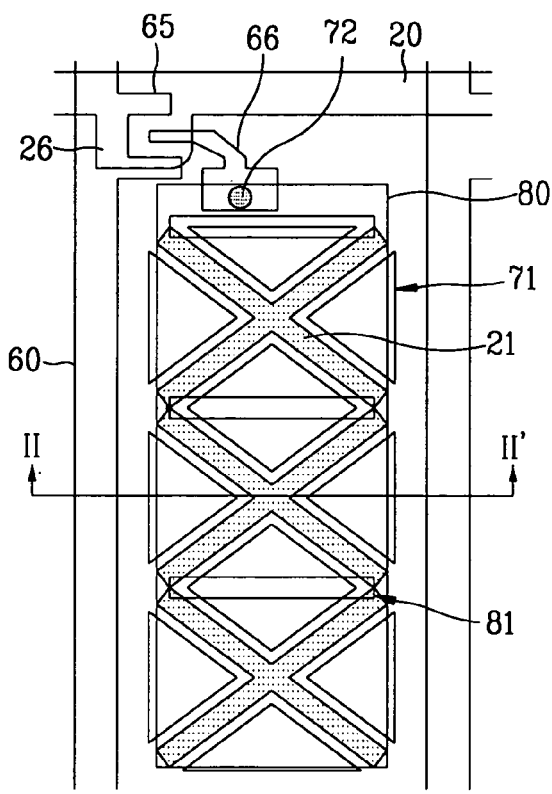
FIG. 1 is a layout view of a panel for a liquid crystal display according to a first embodiment of the present invention.
Figure 2:
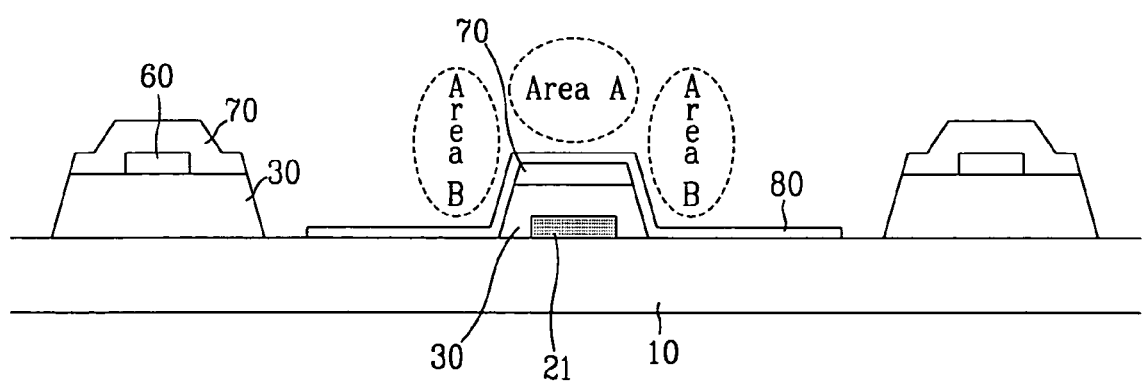
FIG. 2 is a sectional view taken along line II–II' in FIG. 1.

FIG. 1 is a layout view of a panel for a liquid crystal display according to a first embodiment of the present invention and FIG. 2 is a sectional view taken on line II–II' in FIG. 1.

A gate line 20 extending a transverse direction and a gate electrode 26 connected thereto is formed on an insulating substrate 10, and a gate pattern 21 is also formed on the substrate 10. A gate insulating film 30 is formed on both the gate line 20 and the gate electrode 26, and a data line 60 extending in a longitudinal direction is formed on the gate insulating film 30. A source electrode 65 connected to the data line 60 and a drain electrode 66 facing the source electrode 65 are also formed over the gate insulating film 30. Between the source electrode 65 and the drain electrode 66 over the gate electrode 26, lies a semiconductor layer (not shown) as a channel of thin film transistors. A passivation film 70 is formed on the data line 60 and the source and the drain electrodes 65 and 66, and a pixel electrode 80 of ITO (indium-tin-oxide) or IZO (indium-zinc-oxide) is formed on the passivation film 70. This pixel electrode 80 is formed in the pixel area defined by the intersection of the two adjacent data lines 60 and the two adjacent gate lines 20, and is connected to the drain electrode 66 through a contact hole 72 in the passivation film 70. The pixel electrode 80 has openings 81 extending transversely in a straight line. However, the openings 81 may have various shapes.

The pixel electrode 80 has higher portions and lower portions due to a plurality of X-shaped projections disposed thereunder. These projections are made up of the gate pattern 21, the gate insulating film 30 and the passivation film 70. That is, the projections are formed by removing portions 71 of the gate insulating film 30 and the passivation film 70 in the pixel area. Also portions of the gate insulating film 30 and the passivation film 70 located under and over the data line 60 and over the gate line 20 remain for sheltering the signal lines 20 and 60, thereby performing as projections. Besides, the gate pattern 21 is entirely covered with the gate insulating film 30.

The openings 81 of the pixel electrode 80 are disposed between the X-shaped projections aligned in the longitudinal direction. The shape of the projections may be modified into other shapes. When modifying the shape of projections, the shape of the openings 81 may also be modified in order to keep the role of a domain-defining member for adjusting the tilt directions of the liquid crystal molecules.

In this way, electric fields are modified by the projections and the openings, thereby causing the tilt directions of the liquid crystal molecules to be different in respective domains defined by the projections and the openings. Accordingly, high-quality images can be obtained in any viewing direction of the liquid crystal display. In addition, since there is no need to form openings or projections in the common electrode of the upper panel, many problems of the conventional devices can be solved.

On the other hand, the tilt directions of the liquid crystal molecules are disordered around the domain-defining member since the tilt directions of the liquid crystal molecules are different depending on the projections and the openings, thereby causing texture. Since this texture appears as fine spots or afterimage deteriorating the picture quality, it is preferred to cover the texture. The gate pattern 21 covers the texture in this embodiment. However, the gate pattern 21 of FIG. 1 may not fully cover the texture since the texture may appear near the projections (region B) as well as over the projections (region A). To solve this problem, another embodiment of the present invention is suggested.

Figure 3:
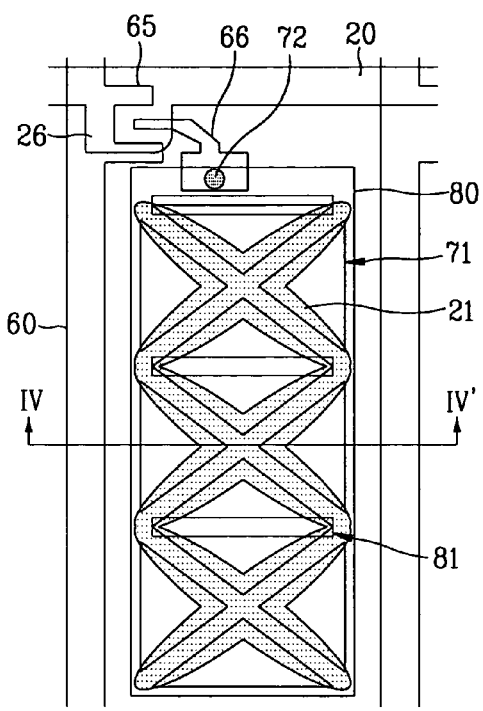
FIG. 3 is a layout view of a panel for a liquid crystal display according to a second embodiment of the present invention.
Figure 4:
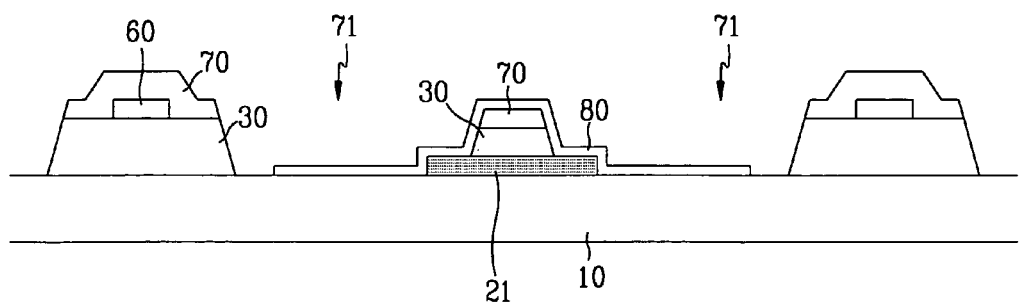
FIG. 4 is a sectional view taken along line IV–IV' in FIG. 3.

FIG. 3 is a layout view of a panel for a liquid crystal display according to a second embodiment of the present invention and FIG. 4 is a sectional view taken along line IV–IV' in FIG. 3.

The structure of the second embodiment is the same as that of the first embodiment except for the projections. In the second embodiment, the width of the gate pattern 21 is larger than that of the projections made up of the gate insulating film 30 and the passivation film 70. Accordingly, in the overlapping parts between the gate pattern 21 and the projections, the outline of the projections is encircled by that of the gate pattern 21. This gate pattern 21 may be modified in consideration for the shape of the texture around the projections.

The texture may be covered by using a black matrix pattern formed in the opposite panel. However, since the black matrix design should make allowance for misaligning margin of two panels, the area occupied by the black matrix is too large, thereby decreasing the aperture ratio.

On the other hand, in the second embodiment, the gate pattern 21 contacts the pixel electrode 80 since the gate pattern 21 is not fully covered by the gate insulating film 30 and the passivation film 70. Accordingly, when using ITO for the pixel electrode 80, it is preferred to form the gate layers 20, 21 and 26 with metals such as Mo, Cr or Ta or alloys thereof since these materials do not make a chemical reaction when directly contacting ITO. When using IZO for the pixel electrode 80, the gate layers 20, 21 and 26 can be formed with aluminum or aluminum alloy.

A shading film pattern such as the gate pattern 21 for covering the texture around the domain-defining member may be formed of the data wire layer. Also the shading film pattern may be provided under the openings, if the pixel electrode is insulated therefrom to ensure the performance of the openings.

As described above, the domain-defining member is provided only in one panel having the pixel electrodes so that the wider viewing angle can be obtained without additional manufacturing processes and that the texture around the domain-defining member can be effectively covered, thereby providing a high-quality liquid crystal display.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A panel for a liquid crystal display, comprising:
an insulating substrate;
a first wire formed on said insulating substrate;
a second wire intersecting and insulated from the first wire;
a pixel area defined by the intersecting of the first wire and the second wire;
a transparent pixel electrode provided in the pixel area;
a domain-defining member provided over said insulating substrate and dividing the pixel area into a plurality of domains; and
an opaque shading film formed on the insulating substrate and covering a texture around the domain defining member,
wherein said shading film is electrically floating and overlaps said domain-defining member at least in part.

2. The panel of claim 1, wherein said domain-defining member comprises projections.

3. The panel of claim 1, wherein said pixel electrode has an opening pattern and said domain-defining member comprises the opening pattern.

4. The panel of claim 1, wherein said domain-defining member comprises projections and an opening of the pixel electrode.

5. A panel for a liquid crystal display, comprising:
an insulating substrate;
a first wire formed on said insulating substrate;
a second wire intersecting the first wire, said second wire insulated from the first wire;
a transparent pixel electrode in a pixel area defined by the intersection of said first wire and said second wire;
a domain-defining member provided over said insulating substrate and comprising projections; and
an opaque shading film formed on the insulating substrate;
wherein the projections comprise an internal projection located in the pixel area and a peripheral projection located around the pixel area, and an outline of the internal projection is encircled by an outline of the shading film.

6. The panel of claim 5, wherein the internal projection comprises an insulating film, and the shading film is formed of the same layer as the first wire.

7. The panel of claim 1, wherein an outline of a portion of the domain-defining member overlapping the shading film is encircled by an outline of the shading film.

8. A panel for a liquid crystal display, comprising:
an insulating substrate;
a first wire formed on the insulating substrate;
an opaque shading film formed on the insulating substrate and spaced apart from the first wire;
a first insulating film formed on said first wire and said shading film;
a second wire formed on said first insulating film;
a second insulating film formed on said second wire and said first insulating film; and
a transparent pixel electrode formed on said second insulating film and said insulating substrate and connected to a portion of said second wire;
wherein said pixel electrode has a first portion overlying the shading film and a second portion surrounding the first portion, and a first distance between the insulating substrate and the first portion is longer than a second distance between the insulating substrate and the second portion.

* * * * *